(12) United States Patent
Fursa

(10) Patent No.: US 11,974,613 B2
(45) Date of Patent: May 7, 2024

(54) CASE FOR AN AEROSOL-GENERATING DEVICE WITH A HOLDER FOR POWER SUPPLY

(71) Applicant: Philip Morris Products S.A., Neuchatel (CH)

(72) Inventor: Oleg Fursa, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 497 days.

(21) Appl. No.: 17/419,026

(22) PCT Filed: Dec. 16, 2019

(86) PCT No.: PCT/EP2019/085445
§ 371 (c)(1),
(2) Date: Jun. 28, 2021

(87) PCT Pub. No.: WO2020/141064
PCT Pub. Date: Jul. 9, 2020

(65) Prior Publication Data
US 2022/0071309 A1    Mar. 10, 2022

(30) Foreign Application Priority Data
Dec. 31, 2018    (EP) .................................... 18215949

(51) Int. Cl.
*A24F 40/95* (2020.01)
*A24F 40/57* (2020.01)
*H02J 7/00* (2006.01)

(52) U.S. Cl.
CPC .............. *A24F 40/95* (2020.01); *A24F 40/57* (2020.01); *H02J 7/0045* (2013.01)

(58) Field of Classification Search
CPC .......... A24F 40/95; A24F 40/57; H02J 7/0045
(Continued)

(56) References Cited

U.S. PATENT DOCUMENTS 4,947,874 A * 8/1990 Brooks ................... A24F 40/50
131/194
2010/0313901 A1 12/2010 Fernando et al.
(Continued)

FOREIGN PATENT DOCUMENTS

CN    2041 46335 U    2/2015
CN    107105777 A    8/2017
(Continued)

OTHER PUBLICATIONS

Extended European Search Report dated Jul. 16, 2019 in European Patent Application No. 18215949.1, 6 pages.
(Continued)

*Primary Examiner* — Gary F Paumen
(74) *Attorney, Agent, or Firm* — Oblon, McClelland, Maier & Neustadt, L.L.P.

(57) ABSTRACT

A case for an aerosol-generating device is provided, the case including: a case housing; a case power supply; a holder to receive the aerosol-generating device, the holder being movably coupled to the case housing and configured for both rotational movement relative to the case housing and translational movement relative to the case housing, and being movable relative to the case housing between an open position to receive the device and a closed position configured to store the device; a case electrical connector to supply power from the case power supply to the device when the device is received within the holder and when the holder is in each of the open and closed positions; an input; and case control circuitry to receive data from the input and to transmit a signal to the device by the connector, the signal being indicative of a state of the input.

13 Claims, 2 Drawing Sheets

(58) Field of Classification Search
USPC .......................................................... 131/329
See application file for complete search history.

(56) References Cited

U.S. PATENT DOCUMENTS

| | | | |
|---|---|---|---|
| 2014/0096781 A1* | 4/2014 | Sears .................. | A24F 40/50 131/328 |
| 2014/0096782 A1* | 4/2014 | Ampolini ............ | A24F 40/60 131/328 |
| 2014/0366900 A1* | 12/2014 | Plojoux ................ | A24F 40/40 131/329 |
| 2015/0013696 A1 | 1/2015 | Plojoux et al. | |
| 2015/0059780 A1* | 3/2015 | Davis ................... | A24F 40/46 392/386 |
| 2015/0366268 A1* | 12/2015 | Shabat ................. | A24F 40/65 131/329 |
| 2016/0050975 A1 | 2/2016 | Worm et al. | |
| 2016/0081395 A1* | 3/2016 | Thorens .............. | A61M 11/042 392/390 |
| 2017/0258133 A1* | 9/2017 | Ampolini ............ | H02J 7/00 |
| 2018/0020735 A1* | 1/2018 | Bilat .................... | A24F 40/50 |
| 2018/0132531 A1* | 5/2018 | Sur ...................... | H02M 7/53871 |
| 2018/0160741 A1 | 6/2018 | Worm et al. | |
| 2018/0192700 A1* | 7/2018 | Fraser ................. | A24F 40/42 |

FOREIGN PATENT DOCUMENTS

| | | |
|---|---|---|
| CN | 107404949 A | 11/2017 |
| CN | 108366625 A | 8/2018 |
| CN | 208192124 U | 12/2018 |
| EP | 3125707 A1 | 2/2017 |
| GB | 2534213 A | 7/2016 |
| JP | 2017-532009 A | 11/2017 |
| KR | 10-2018-0085366 A | 7/2018 |
| RU | 2625932 C2 | 7/2017 |
| WO | WO 2013/102611 A2 | 7/2013 |
| WO | WO 2015/150759 A1 | 10/2015 |
| WO | WO 2016/012795 A1 | 1/2016 |
| WO | WO 2018/217030 A1 | 11/2018 |
| WO | WO 2020/083850 A1 | 4/2020 |

OTHER PUBLICATIONS

International Search Report and Written Opinion dated Apr. 6, 2020 in PCT/EP2019/085445 filed Dec. 16, 2019.
Russian Search Report dated Mar. 9, 2023 in Russian Application 2021120016, (with English Translation), 4 pages.
Russian Decision to Grant dated Mar. 9, 2023 in Russian Application 2021120016, (with English Translation), 15 pages.
Chinese Office Action and Search Report mailed on Oct. 28, 2023 issued in Chinese Patent Application No. 201980081140.7 filed on Dec. 16, 2019, with English Translation, total 9 pages (citing documents 1, 15-16, therein).

* cited by examiner

CASE FOR AN AEROSOL-GENERATING DEVICE WITH A HOLDER FOR POWER SUPPLY

The present invention relates to a case having a movable holder for receiving an aerosol-generating device. The present invention also relates to an aerosol-generating system comprising the case and an aerosol-generating device.

Known electrically operated aerosol-generating systems generally comprise an aerosol-generating device having an atomiser and an electrical power supply for supplying power to the atomiser. The atomiser may be an electric heater. Known systems also generally comprise an aerosol-forming substrate which is received by the device and atomised by the atomiser to release volatile compounds in the aerosol-forming substrate which form an aerosol for inhalation by a user. Some known systems also comprise a case for receiving the aerosol-generating device when not in use. Cases in different systems are known to provide different functions, such as protecting the device when not in use and recharging the battery of the device.

In some known aerosol-generating systems, the aerosol-generating device is configured to receive an aerosol-generating article comprising a solid aerosol-forming substrate, such as a gathered, crimped sheet of tobacco. In these systems, the device typically comprises an atomiser in the form of an electric heater arranged to heat the aerosol-forming substrate and a power supply for supply power to the electric heater. To maintain the device at a desired size, typically the power supply in the aerosol-generating device has sufficient capacity for heating only a single aerosol-forming substrate. Therefore, in systems comprising a case, once the device has been used with a single aerosol-generating article the device must be inserted into the case and re-charged before use with a further article.

It would be desirable to facilitate use of an aerosol-generating device with a plurality of aerosol-generating articles without increasing the capacity of a power supply of the aerosol-generating device.

According to a first aspect of the present invention there is provided a case for an aerosol-generating device, the case comprising a case housing, a case power supply, and a holder for receiving an aerosol-generating device. The holder is movably coupled to the case housing and movable relative to the case housing between an open position for receiving an aerosol-generating device and a closed position for storing an aerosol-generating device. The case also comprises a case electrical connector arranged to supply power from the case power supply to an aerosol-generating device when the aerosol-generating device is received within the holder and when the holder is in each of the open position and the closed position. The case also comprises an input means and case control circuitry configured receive data from the input means. The case control circuitry is configured to transmit a signal to an aerosol-generating device by the case electrical connector, wherein the signal is indicative of the state of the input means.

The case electrical connector is arranged to supply power from the case power supply to an aerosol-generating device received within the holder when the holder is in both the open and closed positions. Advantageously, this may facilitate use of the aerosol-generating device when it is received within the holder. For example, the aerosol-generating device may be used to heat an aerosol-generating article when the holder is in the open position.

The case control circuitry is configured to transmit a signal by the case electrical connector to an aerosol-generating device received within the holder, wherein the signal is indicative of the state of the input means. Advantageously, the signal may facilitate operation of the aerosol-generating device in different modes depending on whether the holder is in the open position or the closed position. For example, the input means may be used to provide data to the case control circuitry indicative of the holder being in the open position, and the case control circuitry may be configured to transmit a signal to an aerosol-generating device indicating that the holder is in the open position. In this scenario, the aerosol-generating device may supply power received from the case power supply directly to a heater of the aerosol-generating device. The input means may be used to provide data to the case control circuitry indicative of the holder being in the closed position, and the case control circuitry may be configured to transmit a signal to an aerosol-generating device indicating that the holder is in the closed position. In this scenario, the aerosol-generating device may supply power received from the case power supply to a device power supply of the aerosol-generating device to recharge the device power supply.

As used herein, the term 'open position' is used to describe positions or orientations of the holder relative to the case housing in which the aerosol-generating device may be received by the holder and removed from the holder and in which the case electrical connector is arranged to supply power from the case power supply to the aerosol-generating device when the aerosol-generating device is received within the holder. Similarly, as used herein the term 'closed position' is used to describe positions of the holder relative to the case housing in which the aerosol-generating device may be substantially prevented or inhibited from being received by the holder and in which the aerosol-generating device may be substantially prevented or inhibited from being removed from the holder.

The holder may be arranged for movement relative to the case housing into an intermediate position between the closed position and the open position. Preferably, when the holder is in the intermediate position, an aerosol-generating device may be received by the holder and removed from the holder. Preferably, the case electrical connector is not arranged to supply power from the case power supply to an aerosol-generating device when the holder is in the intermediate position. Advantageously, the intermediate position may allow insertion of an aerosol-generating device into the holder and removal of an aerosol-generating device from the holder while preventing the transfer of power from the case power supply to the aerosol-generating device.

As used herein, the term 'aerosol-generating device' refers to a device that interacts with an aerosol-forming substrate to generate an aerosol. In certain embodiments, an aerosol-generating device may heat an aerosol-forming substrate to facilitate the release of the volatile compounds from the aerosol-forming substrate. An aerosol-generating device may interact with an aerosol-generating article comprising an aerosol-forming substrate or a cartridge comprising an aerosol-forming substrate. An electrically operated aerosol-generating device may comprise an atomiser, such as an electric heater, to heat the aerosol-forming substrate to form an aerosol.

As used herein, the term 'aerosol-generating article' refers to an article comprising an aerosol-forming substrate capable of releasing volatile compounds which can form an aerosol. In certain embodiments, the aerosol-generating article may comprise an aerosol-forming substrate capable of releasing volatile compounds upon heating, which can condense to form an aerosol.

The input means may be manually operable by a user. The input means may comprise a user operable switch. The switch may comprise a first position and a second position. A user may move the switch between the first position and the second position to provide data to the case control circuitry. The case control circuitry may transmit a signal indicative of whether the switch is in the first position or the second position. The first position of the switch may be used by a user to indicate that the holder is in the open position. The second position of the switch may be used by a user to indicate that the holder is in the second position.

The input means may comprise a holder position detector arranged to detect whether the holder is in the open position or the closed position, and wherein the signal transmitted by the case control circuitry is indicative of whether the holder is in the open position or the closed position based on the data received by the case control circuitry from the holder position detector.

Advantageously, a holder position detector may automatically detect whether the holder is in the closed position or the open position.

In embodiments in which the holder is arranged for movement relative to the case housing into an intermediate position, the holder position detector may be arranged to detect when the holder is in the intermediate position and provide data to the case control circuitry indicative of the holder being in the intermediate position.

The holder position detector may be any type of detector suitable for detecting or sensing the position of the holder relative to the case housing.

The holder position detector may comprise a sensor arranged to sense the position of the holder relative to the case housing. The sensor may be any suitable type of sensor.

The sensor may comprise at least one of a mechanical switch, an optical sensor, an inductive sensor, a magnetic sensor, and a capacitive sensor.

The sensor may be arranged at any suitable location on or in the case to detect relative positions of the holder and the case housing. In some embodiments, the sensor may be arranged on or in the holder and may be configured to sense the position of the case housing or one or more of the components housed within the case housing relative to the holder. In some preferred embodiments, the sensor may be arranged on or in the case housing and configured to sense the position of the holder relative to the case housing. In some particularly preferred embodiments, the sensor may be arranged to sense the presence of an aerosol-generating device within the holder. For example, the sensor may be arranged to detect the aerosol-generating device when the device is received in the holder and the holder is in the closed position.

The optical sensor may be an optical proximity sensor comprising a light source and an optical transducer arranged to receive reflected light from the light source when an object is arranged near or in the vicinity of the sensor. Preferably, the optical proximity sensor is an infra-red proximity sensor. An infra-red proximity sensor may utilise a light source which emits light in the infrared range of the electromagnetic spectrum, typically having wavelengths within the range of about 700 nanometres to about 1100 nanometres.

The mechanical switch may comprise a button or a lever that is movable to open or close an electric circuit. The switch may be moveable between an open position and a closed position. The switch may be biased to one of the open or closed positions. In other words, the switch may be urged to return to one of the open or closed positions in the absence of an external force in the opposite direction. In some embodiments, the switch may be a push-button switch. As used herein, a push-button switch refers to a switch comprising a button that is movable linearly along an axis between an open position and a closed position. In some embodiments, the switch may be a toggle switch or lever switch. As used herein, a toggle switch or lever switch refers to a switch comprising a lever that is movable, generally rotatable, between an open position and a closed position.

Preferably, the mechanical switch is arranged to be actuated by movement of the holder relative to the case between the open position and the closed position.

In some embodiments, the mechanical switch is arranged on or within the holder. In these embodiments, the case housing or one or more of the components housed within the case housing may comprise a switch engaging portion configured to actuate the switch when the holder is moved between the open position and the closed position. In some of these embodiments, the switch engaging portion may comprise a protrusion from the case housing or a shaping of the case housing that contacts and actuates the switch on movement of the holder relative to the case housing.

In some preferred embodiments, the mechanical switch is arranged on or within the case housing. In these embodiments, the holder may comprise a switch engaging portion adapted to actuate the switch when the holder is moved between the open position and the closed position. In some of these embodiments, the switch engaging portion may comprise a protrusion from the holder or a shaping of the holder that contacts and actuates the switch on movement of the holder relative to the case housing.

The case electrical connector may be any suitable type of electrical connector for electrically connecting to an aerosol-generating device received in the holder. The electrical connector may comprise any suitable number of electrical contacts. Preferably, the electrical connector comprises a plurality of electrical contacts.

The electrical connector is configured to transfer power from the case power supply to an aerosol-generating device received in the holder. The electrical connector is configured to transfer the signal from the case control circuitry to an aerosol-generating device received within the holder. The electrical connector may have at least one power electrical contact arranged to transfer electrical power. The electrical connector may have at least one data electrical contact arranged to transfer the signal from the case control circuitry.

The at least one data electrical contact may be configured for the transfer of data in addition to the signal from the case control circuitry indicative of whether the holder is in the open position or the closed position. For example, the case control circuitry may be configured to receive usage data from an aerosol-generating device received within the holder.

Preferably, the case electrical connector is positioned on the holder. Advantageously, this facilitates electrical connection to an aerosol-generating device received within the holder when the holder is in open position and when the holder is in the closed position. The holder may comprise a first end through which an aerosol-generating device may be inserted into the holder and a second end at which the case electrical connector is positioned.

Preferably, the case comprises a flexible connector providing an electrical connection between the case electrical connector and at least one of the case power supply and the case control circuitry. Advantageously, the flexible connector accommodates the relative movement between the holder and the case housing. The flexible connector may comprise an electrical lead. The flexible connector may comprise a ribbon cable.

The holder may be movably coupled to the case housing for sliding movement relative to the case housing. In other words, the holder may be arranged to slide relative to the housing between the closed position and the open position. In embodiments in which the holder is arranged for movement relative to the case housing into an intermediate position, the holder may be arranged to slide relative to the housing between the closed position and the intermediate position. The holder may be arranged to slide relative to the housing between the intermediate position and the open position.

The holder may be movably coupled to the case housing for at least one of rotational movement relative to the case housing and translational movement relative to the case housing. Preferably, the holder is movably coupled to the case housing for both rotational movement relative to the case housing and translational movement relative to the case housing. Advantageously, this may facilitate spacing of at least a portion of an aerosol-generating device received within the holder away from the case housing when the holder is in the open position. Advantageously, this may facilitate use of the aerosol-generating device when the device is received within the holder and when the holder is in the open position.

In embodiments in which the holder is arranged for movement relative to the case housing into an intermediate position, the holder may be arranged to rotate relative to the housing between the closed position and the intermediate position. The holder may be arranged to translate relative to the housing between the intermediate position and the open position. The holder may be arranged to translate and rotate relative to the housing between the intermediate position and the open position.

The holder may be directly coupled to the case housing. The case housing may define at least one slot and the holder may comprise at least one projection, wherein the at least one projection is slidably received within the at least one slot. The at least one slot may define a motion path of the holder when the holder is moved between the open position and the closed position. The at least one slot may comprise a first end and a second end. The at least one projection may be positioned at the first end of the at least one slot when the holder is in the open position. The at least one projection may be positioned at the second end of the at least one slot when the holder is in the closed position.

The holder may be coupled to the case housing by a linkage. The linkage may comprise at least one of a rod and a plate. The linkage may comprise a first end pivotably coupled to the case housing and a second end pivotably coupled to the holder. Pivoting the holder about the second end of the linkage may provide rotational movement of the holder relative to the case housing. Simultaneously pivoting the holder about the second end of the linkage and pivoting the first end of the linkage about the case housing may provide translational movement of the holder relative to the case housing, or both rotational movement and translational movement of the holder relative to the case housing.

The case may further comprise a retention means arranged to releasably retain an aerosol-generating device within the holder. The retention means may be any suitable means for releasably retaining the aerosol-generating device in the holder.

The retention means may comprise a friction fit between the aerosol-generating device and the holder.

The retention means may comprise magnetic retention means. The magnetic retention means may comprise a first magnetic material and a second magnetic material. The first magnetic material may be provided in the aerosol-generating device and the second magnetic material may be provided in the case.

The first and second magnetic materials may be arranged such that the first and second magnetic materials are proximate each other when the aerosol-generating device is received within the holder. Preferably, the first and second magnetic materials may be arranged such that the first and second magnetic materials are attracted to each other when the aerosol-generating device is received within the holder.

The first magnetic material may be arranged at or towards an end of an aerosol-generating device and the second magnetic material may be arranged at or towards an end of the holder. In embodiments in which the case electrical connector is positioned at an end of the holder, the second magnetic material may be arranged adjacent the case electrical connector. The case electrical connector may comprise the second magnetic material. In embodiments in which the case electrical connector comprises at least one electrical contact, the at least one electrical contact may comprise the second magnetic material.

The case power supply may be any suitable type of electrical power supply. For example, the case power supply may comprise one or more batteries and capacitors. The case power supply may comprise a lithium ion battery. Preferably, the case power supply is a rechargeable electrical power supply.

Preferably, the case further comprise a charging connector for connecting the case power supply to an external power supply for recharging the case power supply. The charging connector may comprise any suitable connector for connecting the case power supply to an external power supply. The charging connector may comprise a connector compliant with a universal serial bus (USB) standard. The charging connector may comprise a micro-USB connector.

The case may have any suitable size and shape for receiving an aerosol-generating device. Typically, the case is portable. In other words, the case has a suitable size and shape to be carried by a user. Preferably, the case is a handheld case. In other words, the case has a suitable size to be held in a hand of a user. The case may have a size and shape similar to a conventional packet of cigarettes. The case may have any suitable diameter and any suitable length. The case may have a length between about 50 millimetres and about 200 millimetres. The case may have an external diameter between about 10 millimetres and about 50 millimetres.

The case may have a transverse cross-section of any suitable shape. For example, the case may have a substantially circular, elliptical, triangular, square, rhomboidal, trapezoidal, pentagonal, hexagonal or octagonal transverse cross-section. The case may have a substantially rectangular transverse cross-section. The case may have a substantially constant transverse cross-section along its length. The case may have a substantially rectangular transverse cross-section along its length. In particular embodiments, the case may be a substantially rectangular cuboid.

The case housing and the holder may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

According to a second aspect of the present invention there is provided an aerosol-generating system comprising a case according to the first aspect of the present invention, in accordance with any of the embodiments described herein. The aerosol-generating system also comprises an aerosol-generating device comprising a cavity for receiving an aerosol-forming substrate, a heater arranged to heat an aerosol-forming substrate when the aerosol-forming substrate is received within the cavity, and a device power supply. The aerosol-generating device also comprises a device electrical connector arranged to connect to the case electrical connector when the aerosol-generating device is received within the holder. The aerosol-generating device also comprises device control circuitry configured to receive the signal from the case control circuitry indicative of the state of the input means.

In embodiments in which the input means comprises a holder position detector, the device control circuitry is configured to receive the signal from the case control circuitry of whether the holder is in the open position or the closed position.

Preferably, the device control circuitry is configured to supply power from the device power supply to the heater when the aerosol-generating device is not received within the holder. Advantageously, this allows use of the aerosol-generating device to heat an aerosol-generating article when the aerosol-generating device is not received within the holder.

Preferably, the device control circuitry is configured to supply power received from case power supply to the heater when the aerosol-generating device is received within the holder and when the holder is in the open position. Advantageously, this facilitates use of the aerosol-generating device when it is received within the holder. For example, the aerosol-generating device may be used to heat an aerosol-generating article when the holder is in the open position.

Preferably, the device control circuitry is configured to supply power received from the case power supply to the device power supply when the aerosol-generating device is received within the holder and when the holder is in the closed position. Advantageously, this recharges the device power supply when the aerosol-generating device is not in use.

The aerosol-generating device may have any suitable size and shape.

The aerosol-generating device may be a handheld device. In other words, the aerosol-generating device may have any size and shape suitable to be held in the hand of a user. The aerosol-generating device may have a size and shape similar to a conventional cigarette or cigar. The aerosol-generating device may be portable.

The aerosol-generating device may have a transverse cross-section of any suitable shape. For example, the aerosol-generating device may have a substantially circular, elliptical, triangular, square, rhomboidal, trapezoidal, pentagonal, hexagonal or octagonal transverse cross-section. The aerosol-generating device may have a substantially circular transverse cross-section.

The aerosol-generating device may have a substantially constant transverse cross-section along its length. The aerosol-generating device may have a substantially circular transverse cross-section along its length. The aerosol-generating device may have rotational symmetry about a longitudinal axis. The aerosol-generating device may be substantially circularly cylindrical.

The aerosol-generating device may have any suitable diameter and any suitable length. The aerosol-generating device may be elongate. The aerosol-generating device may have a shape, diameter and length substantially similar to a conventional cigarette or cigar. The aerosol-generating device may have a length of between about 30 millimetres and about 150 millimetres. The aerosol-generating device may have an external diameter between about 5 millimetres and about 30 millimetres.

The aerosol-generating device may comprise a device housing. In particular embodiments, the device housing may be substantially circularly cylindrical. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

The aerosol-generating device comprises a device power supply. The device power supply may be any suitable types of electrical power supply. For example, the device power supply may comprise one or more batteries and capacitors. The device power supply may comprise a lithium ion battery. Preferably, the device power supply is a rechargeable electrical power supply.

The device electrical connector may be any suitable type of electrical connector for electrically connecting the aerosol-generating device with the case electrical connector. The device electrical connector may comprise any suitable number of electrical contacts. Preferably, the device electrical connector comprises a plurality of electrical contacts.

The device electrical connector is configured to receive power from the case power supply by the case electrical connector. The device control circuitry is configured to receive the signal from the case control circuitry by the device electrical connector. The device electrical connector may have at least one power electrical contact arranged to receive electrical power. The device electrical connector may have at least one data electrical contact arranged to receive the signal from the case control circuitry.

The at least one data electrical contact may be configured for the transfer of data in addition to the signal from the case control circuitry indicative of whether the holder is in the open position or the closed position. For example, the device control circuitry may be configured to transmit usage data from the aerosol-generating device to the case control circuitry by the device electrical connector and the case electrical connector.

The invention will be further described, by way of example only, with reference to the accompanying drawings, in which.

Figure 1:
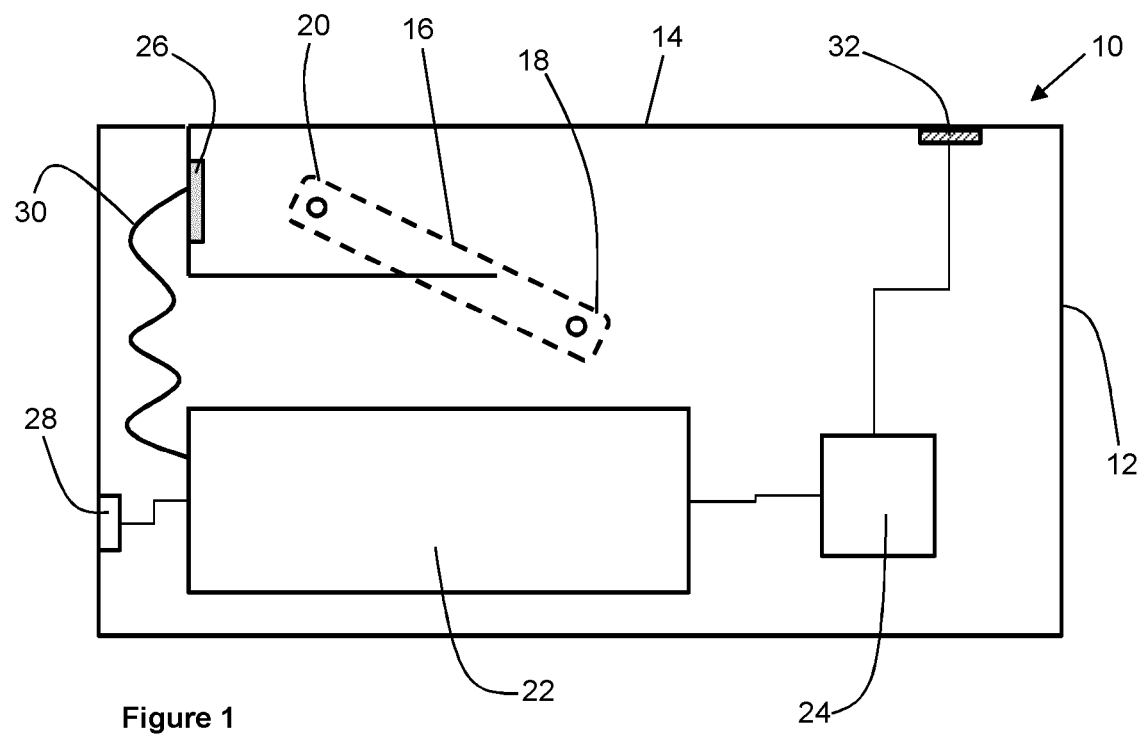
FIG. 1 shows a cross-sectional view of a case in accordance with an embodiment of the present invention and with the holder in the closed position.
Figure 2:
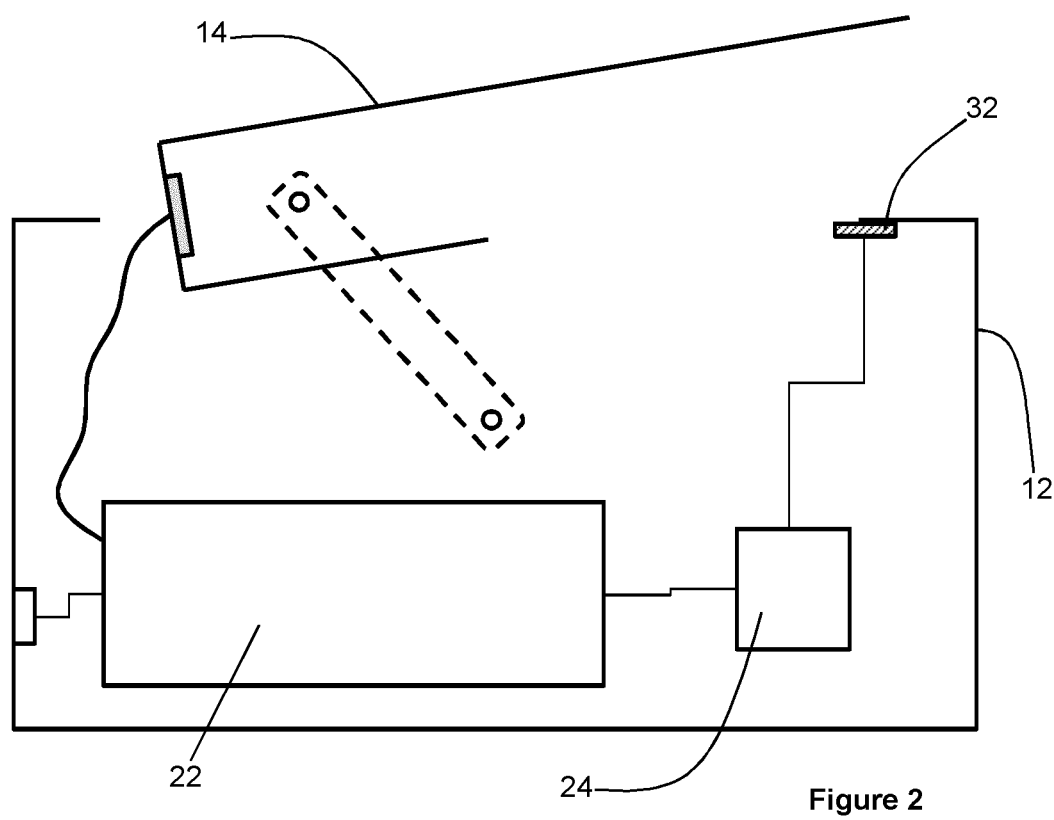
FIG. 2 shows a cross-sectional view of the case of FIG. 1 with the holder in the open position.

FIGS. 1 and 2 show a cross-sectional view of a case 10 for an aerosol-generating device in accordance with an embodiment of the present invention. The case 10 comprises a case housing 12 and a holder 14 movably coupled to the case housing 12. The holder 14 may receive an aerosol-generating device.

The holder 14 is coupled to the case housing 12 by a linkage 16. A first end 18 of the linkage 16 is pivotably connected to the case housing 12 and a second end 20 of the linkage 16 is pivotably connected to the holder 14. The arrangement of the linkage 16 is such that the holder 14 may be rotated with respect to the case housing 12 and translated with respect to the case housing 12 between a closed position shown in FIG. 1 and an open position shown in FIG. 2.

The case 10 also comprises a case power supply 22, case control circuitry 24, and a case electrical connector 26. The case power supply 22 comprises a rechargeable battery. A charging connector 28 in the form of a micro-USB connector allows the case 10 to receive power from an external power source for recharging the case power supply 22.

The case electrical connector 26 is positioned at an end of the holder 14 and is connector to the case power supply 22 by a flexible connector 30. The flexible connector 30 comprises a ribbon cable and accommodates movement of the holder 14 between the open position and the closed position. When an aerosol-generating device is received within the holder 14, the case control circuitry 24 controls a supply of power from the case power supply 22 to the aerosol-generating device via the flexible connector 30 and the case electrical connector 26.

The case 10 also comprises an input means comprising a holder position detector 32 positioned on the case housing 12 adjacent to the holder 14. The holder position detector 32 comprises an optical proximity sensor arranged to sense whether the holder 14 is in the open position or the closed position. Based on data received from the holder position detector 32 the case control circuitry 24 transmits a signal indicative of whether the holder 14 is in the open position or the closed position. The signal is transmitted to an aerosol-generating device via the flexible connector 30 and the case electrical connector 26 when the aerosol-generating device is received within the holder 14.

In an alternative embodiment (not shown), the input means comprises a user operable switch that may be manually operated by a user. In this embodiment, the case control circuitry 24 transmits a signal indicative of the position of the user operable switch.

Figure 3:
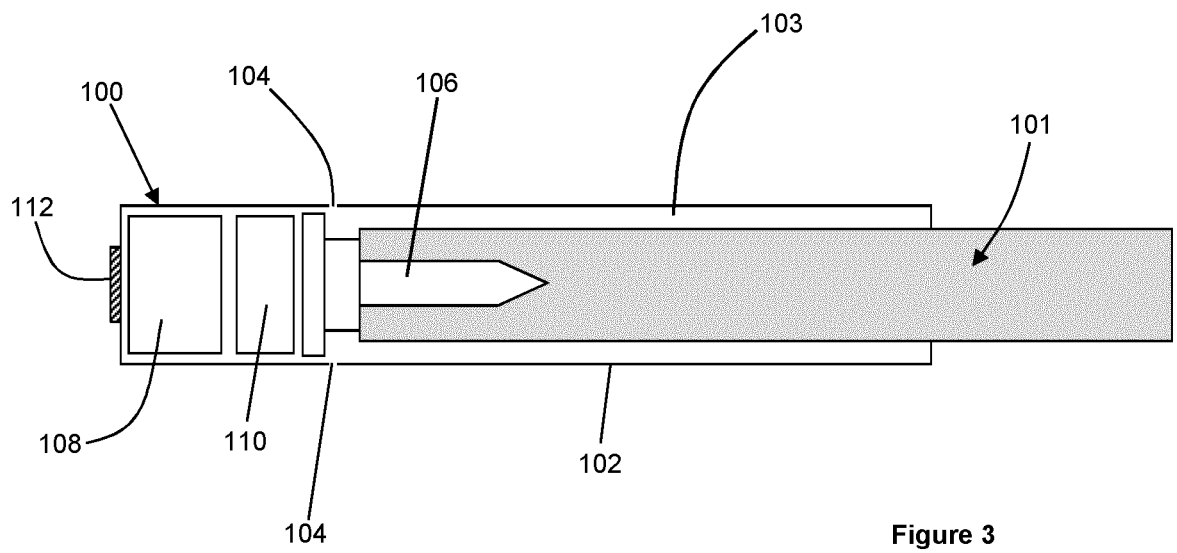
FIG. 3 shows a cross-sectional view of an aerosol-generating device in combination with an aerosol-generating article.

FIG. 3 shows a cross-sectional view of an aerosol-generating device 100 in combination with an aerosol-generating article 101. The aerosol-generating device 100 comprises a device housing 102 defining a cavity 103 for receiving the aerosol-generating article 101, as shown in FIG. 3. The device housing 102 also defines a plurality of air inlets 104 in fluid communication with an upstream end of the cavity 103. A heater 106 is positioned within the cavity 103 and arranged for insertion into the aerosol-generating article 101 when the aerosol-generating article 101 is received within the cavity 103. The aerosol-generating device 100 also comprises a device power supply 108, device control circuitry 110, and a device electrical connector 112.

Figure 4:
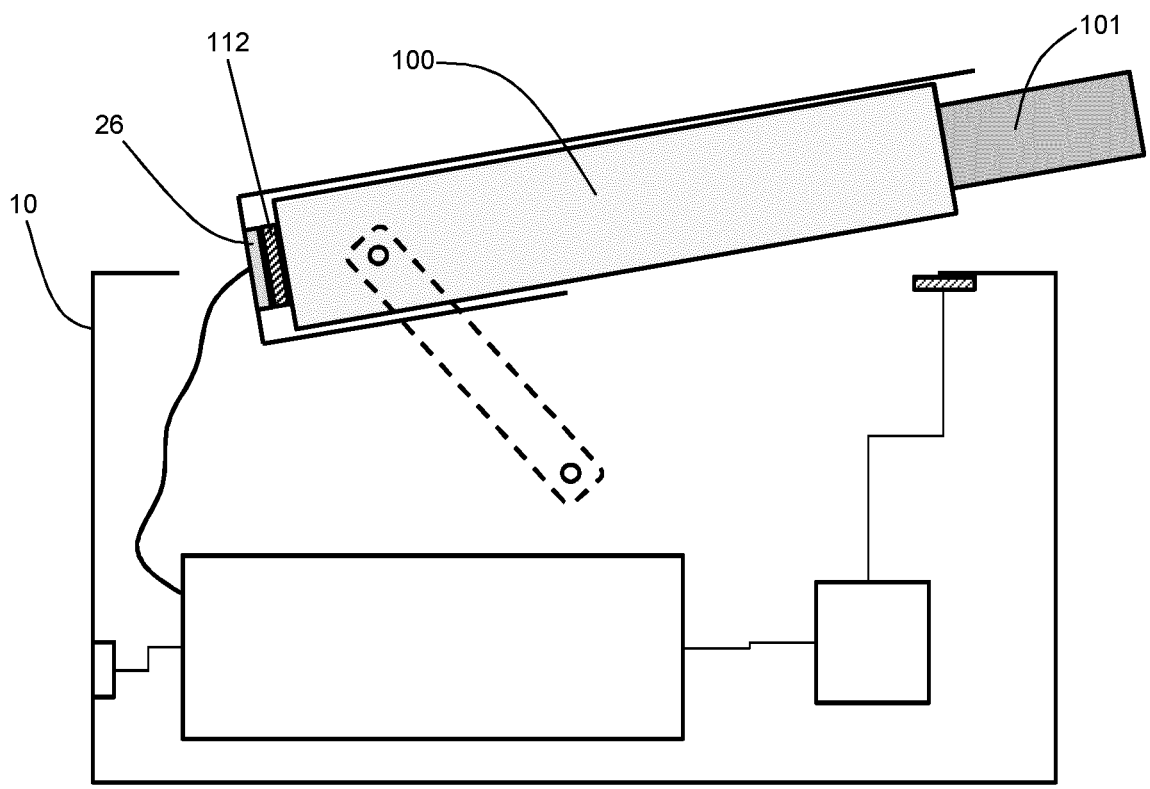
FIG. 4 shows a cross-sectional view of an aerosol-generating system comprising the aerosol-generating device of FIG. 3 receive within the case of FIG. 1.

FIG. 4 shows the aerosol-generating device 100 received within the holder 14 of the case 10. In FIG. 4, the holder 14 is in the open position and the aerosol-generating article 101 is received within the cavity 103 of the aerosol-generating device 100. When the aerosol-generating article 101 is removed from the aerosol-generating device 100, the aerosol-generating device 100 may remain within the holder 14 when the holder 14 is moved into the closed position.

When the aerosol-generating device 100 is received within the holder 14 the device electrical connector 112 is connected to the case electrical connector 26. The aerosol-generating device 100 receives power from the case power supply 22 and the signal from the case control circuitry 24 indicative of whether the holder 14 is in the open position or the closed position.

The device control circuitry 110 is configured to supply the power received from the case power supply 22 directly to the heater 106 when the device control circuitry 110 receives a signal indicative of the holder 14 being in the open position and when the aerosol-generating article 101 is received within the cavity 103. Advantageously, this allows use of the aerosol-generating device 100 to heat the aerosol-generating article 101 when insufficient power remains in the device power supply 108.

The device control circuitry 110 is configured to supply the power received from the case power supply 22 to the device power supply 108 to recharge the device power supply 108 when the device control circuitry 110 receives a signal indicative of the holder 14 being in the closed position.

The invention claimed is:

1. A case for an aerosol-generating device, the case comprising:
   a case housing;
   a case power supply;
   a holder configured to receive the aerosol-generating device, the holder being movably coupled to the case housing and further configured for both rotational movement relative to the case housing and translational movement relative to the case housing, and being movable relative to the case housing between an open position configured to receive the aerosol-generating device and a closed position configured to store the aerosol-generating device;
   a case electrical connector configured to supply power from the case power supply to the aerosol-generating device when the aerosol-generating device is received within the holder and when the holder is in each of the open position and the closed position;
   an input means; and
   case control circuitry configured to receive data from the input means and to transmit a signal to the aerosol-generating device by the case electrical connector, wherein the signal is indicative of a state of the input means.

2. The case according to claim 1,
   wherein the input means comprises a user operable switch, and
   wherein the signal is indicative of a position of the user operable switch.

3. The case according to claim 1,
   wherein the input means comprises a holder position detector configured to detect whether the holder is in the open position or the closed position, and
   wherein the signal is indicative of whether the holder is in the open position or the closed position based on the data received by the case control circuitry from the holder position detector.

4. The case according to claim 3, wherein the holder position detector comprises a sensor configured to sense a position of the holder relative to the case housing.

5. The case according to claim 4, wherein the sensor comprises at least one of a mechanical switch, an optical sensor, an inductive sensor, a magnetic sensor, and a capacitive sensor.

6. The case according to claim 1, wherein the case electrical connector is positioned on the holder.

7. The case according to claim 6, further comprising a flexible connector providing an electrical connection between the case electrical connector and at least one of the case power supply and the case control circuitry.

8. The case according to claim 1,
wherein the holder is movably coupled to the case housing by a linkage, and
wherein the linkage comprises a first end pivotably coupled to the case housing and a second end pivotably coupled to the holder.

9. The case according to claim 1, further comprising a retention means configured to releasably retain the aerosol-generating device within the holder.

10. An aerosol-generating system, comprising:
a case according to claim 1; and
an aerosol-generating device comprising:
- a cavity configured to receive an aerosol-forming substrate,
- a heater configured to heat the aerosol-forming substrate when the aerosol-forming substrate is received within the cavity,
- a device power supply,
- a device electrical connector configured to connect to a case electrical connector when the aerosol-generating device is received within the holder, and
- device control circuitry configured to receive a signal from case control circuitry indicative of a state of an input means of the case.

11. The aerosol-generating system according to claim 10, wherein the device control circuitry is further configured to supply power received from case power supply to the heater when the aerosol-generating device is received within the holder and when the holder is in an open position.

12. The aerosol-generating system according to claim 10, wherein the device control circuitry is further configured to supply power received from the case power supply to the device power supply when the aerosol-generating device is received within the holder and when the holder is in a closed position.

13. The aerosol-generating system according to claim 10, wherein the device control circuitry is further configured to supply power from the device power supply to the heater when the aerosol-generating device is not received within the holder.

* * * * *